(12) United States Patent
Grobman et al.

(10) Patent No.: US 7,752,436 B2
(45) Date of Patent: Jul. 6, 2010

(54) EXCLUSIVE ACCESS FOR SECURE AUDIO PROGRAM

(75) Inventors: Steven Grobman, El Dorado Hills, CA (US); David Grawrock, Aloha, OR (US); Narendar B. Sahgal, Portland, OR (US); Joe Gruber, West Chester, OH (US)

(73) Assignee: Intel Corporation, Santa Clara, CA (US)

( * ) Notice: Subject to any disclaimer, the term of this patent is extended or adjusted under 35 U.S.C. 154(b) by 1298 days.

(21) Appl. No.: 11/200,662

(22) Filed: Aug. 9, 2005

(65) Prior Publication Data
US 2007/0038997 A1     Feb. 15, 2007

(51) Int. Cl.
*H04L 29/06* (2006.01)
(52) U.S. Cl. .......... 713/164; 718/108
(58) Field of Classification Search ............ 713/164
See application file for complete search history.

(56) References Cited

U.S. PATENT DOCUMENTS

| | | | |
|---|---|---|---|
| 4,835,677 A | 5/1989 | Sato et al. | |
| 5,339,417 A | 8/1994 | Connell et al. | |
| 5,671,442 A | 9/1997 | Feeney et al. | |
| 6,496,847 B1 | 12/2002 | Bugnion et al. | |
| 6,795,905 B1 * | 9/2004 | Ellison et al. | 711/163 |
| 6,836,888 B1 * | 12/2004 | Basu et al. | 718/104 |
| 6,871,283 B1 * | 3/2005 | Zurko et al. | 726/10 |
| 6,941,458 B1 * | 9/2005 | Ellison et al. | 713/164 |
| 7,028,149 B2 * | 4/2006 | Grawrock et al. | 711/156 |
| 7,082,598 B1 * | 7/2006 | Le et al. | 717/127 |
| 7,120,802 B2 * | 10/2006 | Shear et al. | 713/194 |
| 7,213,125 B2 * | 5/2007 | de Dinechi | 711/203 |
| 7,546,457 B2 * | 6/2009 | Sutton et al. | 713/164 |
| 2001/0037450 A1 * | 11/2001 | Metlitski et al. | 713/152 |
| 2002/0069335 A1 | 6/2002 | Flylnn, Jr. | |
| 2002/0161961 A1 * | 10/2002 | Hardin et al. | 711/6 |
| 2003/0191943 A1 * | 10/2003 | Poisner et al. | 713/181 |
| 2003/0196100 A1 * | 10/2003 | Grawrock et al. | 713/193 |

(Continued)

FOREIGN PATENT DOCUMENTS

EP     1 467 282 A2     10/2004

(Continued)

OTHER PUBLICATIONS

Robins J S et al.; "Analysis of the Intel Pentium's Ability to Support a Secure Virtual Machine Monitor", Proceedings of the Unenix Security Symposium, Aug. 14, 2000, pp. 129-144, XP002248053.

(Continued)

*Primary Examiner*—Farid Homayounmehr
(74) *Attorney, Agent, or Firm*—Blakely, Sokoloff, Taylor & Zafman LLP (57) ABSTRACT

Executing a monitor on a platform, the monitor capable of providing exclusive, secure access to an audio I/O device of the platform, executing a first partition on the platform, providing an audio device model in the first partition by directly mapping the audio I/O device from the monitor to the first partition for applications executing in the first partition, and providing exclusive, secure access to the audio I/O device to a program performing an audio function in a secure mode in the first partition.

19 Claims, 4 Drawing Sheets

U.S. PATENT DOCUMENTS

| | | | |
|---|---|---|---|
| 2003/0229794 A1* | 12/2003 | Sutton et al. | 713/189 |
| 2005/0034125 A1* | 2/2005 | Guy et al. | 718/100 |
| 2005/0078944 A1* | 4/2005 | Risan et al. | 386/94 |
| 2005/0091652 A1* | 4/2005 | Ross et al. | 718/1 |
| 2005/0132365 A1* | 6/2005 | Madukkarumukumana et al. | 718/1 |
| 2005/0223220 A1* | 10/2005 | Campbell et al. | 713/164 |
| 2006/0026387 A1* | 2/2006 | Dinechin et al. | 712/1 |
| 2006/0064697 A1* | 3/2006 | Kagi et al. | 718/103 |
| 2006/0077472 A1* | 4/2006 | Yahata et al. | 358/296 |
| 2006/0112416 A1* | 5/2006 | Ohta et al. | 726/1 |
| 2006/0136720 A1* | 6/2006 | Armstrong et al. | 713/164 |
| 2007/0028244 A1* | 2/2007 | Landis et al. | 718/108 |
| 2008/0148048 A1* | 6/2008 | Govil et al. | 713/164 |

FOREIGN PATENT DOCUMENTS

| | | |
|---|---|---|
| WO | WO 03/090070 A2 | 10/2003 |
| WO | WO 2005/029326 A1 | 3/2005 |

OTHER PUBLICATIONS

PCT, International Search Report and Written Opinion of the International Searching Authority, Application No. PCT/US2006/029609, mailed Feb. 13, 2007.

PCT, International Preliminary Report On Patentability (Chapter 1 Of The Patent Cooperation Treaty), Application No. PCT/US2006/029609, mailed Feb. 21, 2008.

"FMware Worksation 3.2", Configuring Sound in VMware Workstation, http://www.vmware.com/support/ws3/doc/ws32_vidsound4.html, 2005 VMware.

CN PTO, "First Office Action", Chinese Patent Application No. 200680028937.3 (PCT/US2006/029609), Office Action issued Apr. 24, 2009, 4 pages.

EPO, "First Office Action", European Patent Application No. 06788909.7-2212; mailed Jun. 6, 2008, 3 pages.

\* cited by examiner

EXCLUSIVE ACCESS FOR SECURE AUDIO PROGRAM

BACKGROUND

A processor based system using a processor such as an Intel® Pentium 4 processor may be a personal computer, server computer, workstation, personal desktop assistant (PDA), game system, set top box, or smart mobile phone, among others. Such a system (alternatively termed a platform herein) may include one or more audio input and output devices. These devices may include for example an on-board audio or sound card connected to a bus of the system, such as a PCI Express™ bus; an external device connected to the system by a peripheral bus such as a Universal Serial Bus (USB); or even a remotely connected device over a data network to which audio input data and output data of the system is directed using a network connection, which may be over a network cable or a wireless radio or infrared link. Such a device may provide, for example, the ability to output sounds generated or processed by programs executing on the platform over one or more analog or digital output channels in various formats, such as line level analog audio, SP/DIF digital audio, digital bit streams encoding surround audio such as a Dolby Digital® bitstream, among many others that are known. Similarly, a device may alternatively or also provide audio input capabilities, either in analog or digital format, thus allowing input from, for example, a microphone, line level analog audio source, or digital bit stream with an encoded audio stream in various formats. Such audio input data may then be received, processed, analyzed, and stored by programs of the system to perform various functions.

Such audio capabilities of a processor based system allow in one example, the use of the platform for voice communication over a network using a Voice over Internet Protocol (VOIP). Applications such as Skype and PGPhone address concerns relating to the security and privacy of conversations conducted over VOIP by encrypting voice data before it is transmitted over the Internet or another network. However, data encoding a voice or other communication in an unencrypted format is still generally available on the platform where it is being received or to which it is being sent. This is because either in the initial stage when the voice or message audio is input and in the final stage when it is output, direct memory access by the audio device to a buffer of unencrypted digitized audio data is generally required. This may allow a malicious process on the platform access to the unencrypted audio data. It is possible to circumvent this issue by encrypting audio within the hardware before buffering it, but such solutions would require the installation of new audio hardware. Furthermore, even if audio data is encrypted whenever in digital form, if analog audio is being output from a platform device into, or being input from, the ambient environment, a malicious process may silently use an audio device of the platform in an input mode, such as a microphone, to record the audio data from the ambient environment if such a recording is possible.

DETAILED DESCRIPTION

Some embodiments may include virtualization systems. Virtualization is a technique that enables a processor based host machine with support for virtualization in hardware and software, or in some cases, in software only, to present an abstraction of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems provide guest software operating in a virtual machine with a set of resources (e.g., processors, memory, IO devices) and may map some or all of the components of a physical host machine into the virtual machine, or create fully virtual components. The virtualization system may thus be said to provide a virtual bare machine interface to guest software. In some embodiments, virtualization systems may include a virtual machine monitor (VMM) which controls the host machine. The VMM provides guest software operating in a virtual machine (VM) with a set of resources such as processors, memory, and IO devices. The VMM may map some or all of the components of a physical host machine into the virtual machine, and may create fully virtual components, emulated in software in the VMM, which are included in the virtual machine (e.g., virtual IO devices). The VMM uses facilities in a hardware virtualization architecture to provide services to a virtual machine and to provide protection from and between multiple virtual machines executing on the host machine. Generally, the memory space in which the VMM operates is a part of host physical memory that is not accessible to any of the virtual machines that are serviced by the VMM.

Figure 1:
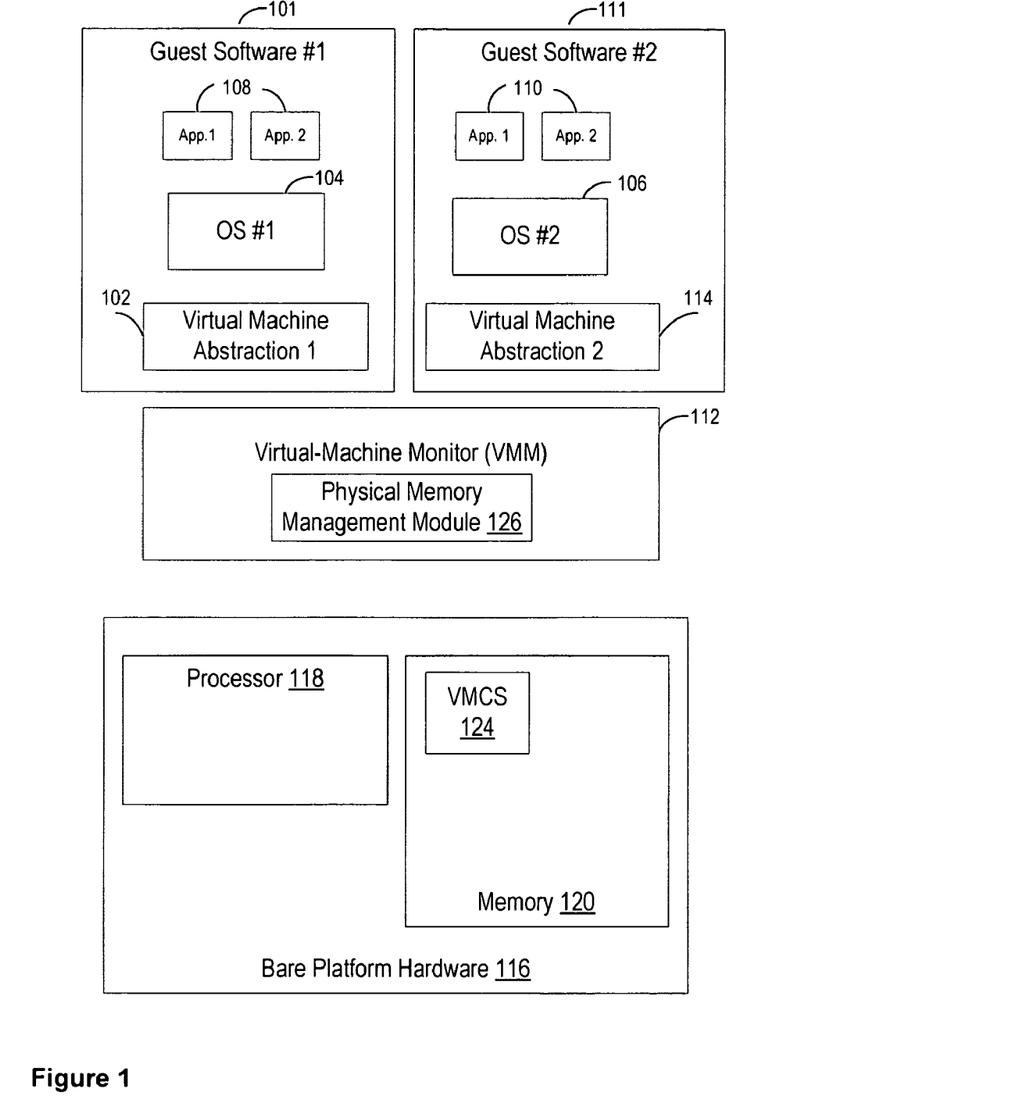
FIG. 1 is a high level block diagram of a virtualized environment in one embodiment.

FIG. 1 illustrates one embodiment of a virtual-machine environment 100. In this embodiment, a processor-based platform 116 may execute a VMM 112. The VMM, though typically implemented in software, may emulate and export a virtual bare machine interface to higher level software. Such higher level software may comprise a standard OS, a real time OS, or may be a stripped-down environment with limited operating system functionality and may not include OS facilities typically available in a standard OS in some embodiments. Alternatively, for example, the VMM 112 may be run within, or using the services of, another VMM. VMMs may be implemented, for example, in hardware, software, firmware or by a combination of various techniques in some embodiments.

The platform hardware 116 may be a personal computer (PC), mainframe, handheld device such as a personal digital assistant (PDA) or "smart" mobile phone, portable computer, set top box, or another processor-based system. The platform hardware 116 includes at least a processor 118 and memory 120. Processor 118 may be any type of processor capable of executing programs, such as a microprocessor, digital signal processor, microcontroller, or the like. The processor may include microcode, programmable logic or hard coded logic for execution in embodiments. Although FIG. 1 shows only one such processor 118, there may be one or more processors in the system in an embodiment. Additionally, processor 118 may include multiple cores, support for multiple threads, or the like. Memory 120 can comprise a hard disk, a floppy disk, random access memory (RAM), read only memory (ROM), flash memory, any combination of the above devices, or any other type of machine medium readable by processor 118 in various embodiments. Memory 120 may store instructions and/or data for performing program execution and other method embodiments.

The VMM 112 presents to guest software an abstraction of one or more virtual machines, which may provide the same or different abstractions to the various guests. FIG. 1 shows two virtual machines, 102 and 114. Guest software such as guest software 101 and 111 running on each virtual machine may include a guest OS such as a guest OS 104 or 106 and various guest software applications 108 and 110. Guest software 101 and 111 may access physical resources (e.g., processor registers, memory and I/O devices) within the virtual machines on which the guest software 101 and 111 is running and to perform other functions. For example, the guest software 101 and 111 expects to have access to all registers, caches, structures, I/O devices, memory and the like, according to the architecture of the processor and platform presented in the virtual machine 102 and 114.

In one embodiment, the processor 118 controls the operation of the virtual machines 102 and 114 in accordance with data stored in a virtual machine control structure (VMCS) 124. The VMCS 124 is a structure that may contain state of guest software 101 and 111, state of the VMM 112, execution control information indicating how the VMM 112 wishes to control operation of guest software 101 and 111, information controlling transitions between the VMM 112 and a virtual machine, etc. The processor 118 reads information from the VMCS 124 to determine the execution environment of the virtual machine and to constrain its behavior. In one embodiment, the VMCS 124 is stored in memory 120. In some embodiments, multiple VMCS structures are used to support multiple virtual machines.

Resources that can be accessed by guest software (e.g., 101, including guest OS 104 and application 108) may either be classified as "privileged" or "non-privileged." For privileged resources, the VMM 112 facilitates functionality desired by guest software while retaining ultimate control over these privileged resources. Further, each guest software 101 and 111 expects to handle various platform events such as exceptions (e.g., page faults, general protection faults, etc.), interrupts (e.g., hardware interrupts, software interrupts), and platform events (e.g., initialization (INIT) and system management interrupts (SMIs)). Some of these platform events are "privileged" because they must be handled by the VMM 112 to ensure proper operation of virtual machines 102 and 114 and for protection from and among guest software. Both guest operating system and guest applications may attempt to access privileged resources and both may cause or experience privileged events. Privileged platform events and access attempts to privileged resources are collectively referred to as "privileged events" or "virtualization events" herein.

Figure 2:
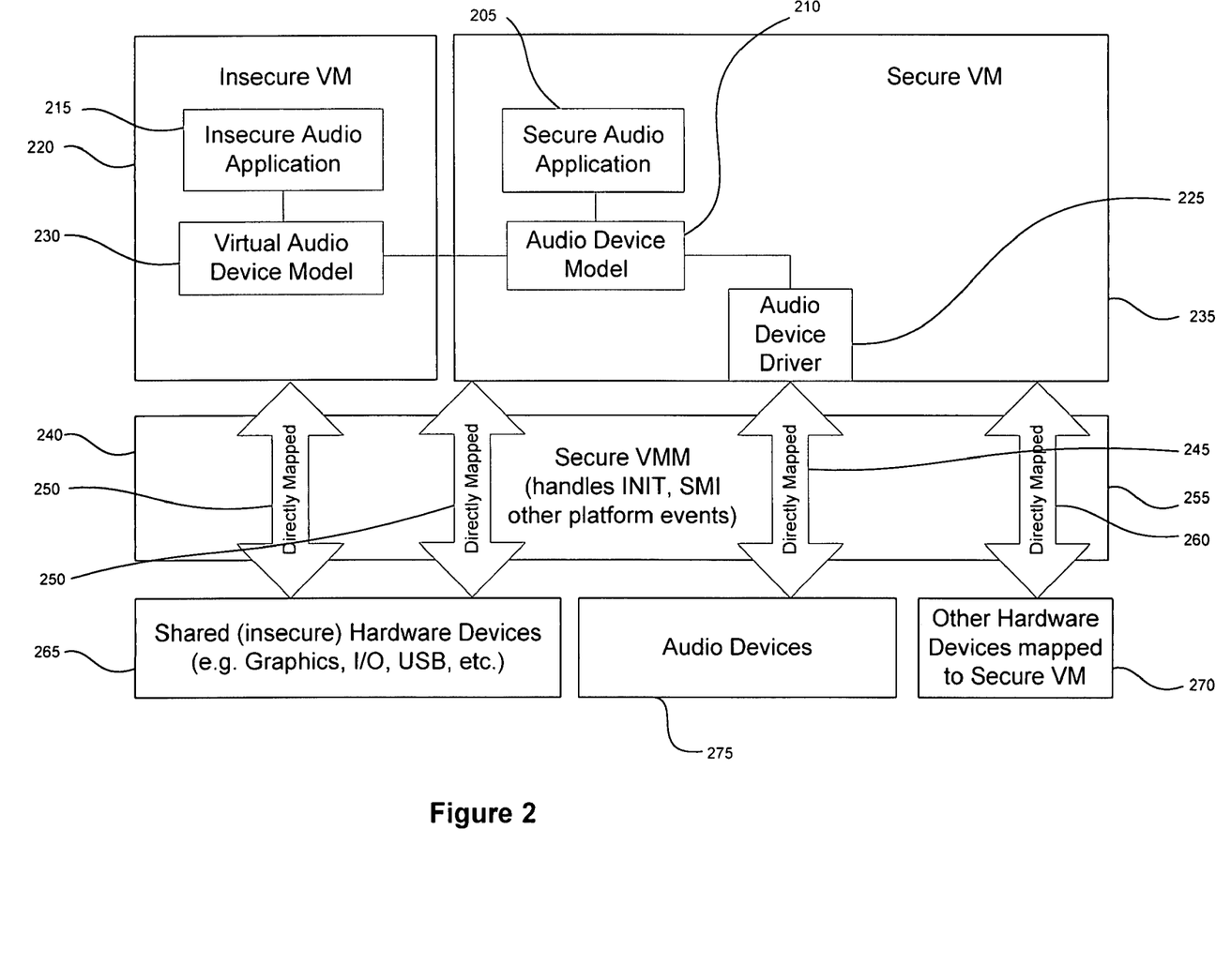
FIG. 2 is a high level block diagram of the major components in one embodiment.

FIG. 2 depicts a high level view of a system in one embodiment. A platform depicted in the figure has a set of hardware devices such as general, shared hardware devices 265 which may or may not be secured for exclusive access, such as for example graphics or display devices, input and output devices such as keyboards, printers, etc. and other devices on a bus such as a USB bus. It may also have a set of devices that are securable by a secure VMM (SVMM) 240, such as the audio i/o device 275 and possibly other devices 270. In this embodiment, the VMM may secure access to a device by monitoring access to the device and setting up an interrupt in the hardware support for virtualization when either a direct memory access (DMA) to a device buffer or other access to the device occurs and then processing the interrupt based on the source of the attempted access. Thus for example, if a secure VM 235 and another (insecure) VM 220 are executing on the platform under the supervision of the SVMM 240, the SVMM may disable any access to the audio device 275 by a process if the process is executing in the insecure VM 220. Furthermore, in this embodiment, SVMM code and data reside in a portion of the host's physical memory that is inaccessible to the VMs executing on the host. This may be achieved by techniques such as memory partition or memory remapping, among others.

In the embodiment shown, device driver or drivers 225 for the audio device of the platform are only available within the secure VM 235 by a direct mapping to the audio hardware 275 provided by the SVMM 240 to the secure VM 235. A process 205 that is executing within secure VM 235 then accesses the audio hardware via an audio device model 210 in the secure VM 235. However, although audio data is also available to a process 215 executing in another insecure VM, it is only available to that process via a virtual audio device model 230 which is a mapping of the "real" audio device model 210 from the secure VM. Thus, applications in the secure VM 205 may disable the virtual device audio model 230.

Other hardware devices 270 may similarly be exclusively mapped 260 to the secure VMM 235. On the other hand, insecure devices may be directly mapped 250 to both the insecure VM 220 and the secure VM 235 and access to them may remain unrestricted.

The operation of the secure audio embodiment may be understood with reference to two cases. The first case is the operation of the embodiment when an insecure audio application such as the application 215 in FIG. 2 seeks output-only access to the audio device 275 at the same time that secure audio application 205 may also be using the audio device for output. Because generally the concern is that a malicious process may be eavesdropping on a secure or private conversation, output-only access to audio is generally freely allowed in the embodiment even for insecure programs. Thus, in this case, the outputs of the audio device model 210 and the virtual audio device model 230 are combined by summing or a similar method and output in a combined fashion through one or more audio devices 275.

The second case is the operation of the embodiment when a program in the insecure VM, i.e. when insecure audio application 215, seeks to access its audio interface, the virtual audio device model, for input. If a program in the secure VM or secure audio application 205 is accessing the audio device of the platform via the audio device model 210 in a secure mode, it may block access to the one or more audio devices 275 from the insecure VM by either blocking, masking, or simulating disconnection of the virtual audio device. This is generally done both in the case when the secure audio application is producing audio output data or in the case when it is in an audio input mode, because a malicious process in the insecure VM may be able to eavesdrop on the output of the secure audio application or the environmental sound such as a speaker's voice that is being input to the secure application.

Other secure platform features available via the SVMM may include the ability to protect system memory, or portions thereof, from direct access bypassing a processor; and ability to set read, write or execute restrictions on regions of system memory.

Figure 3:
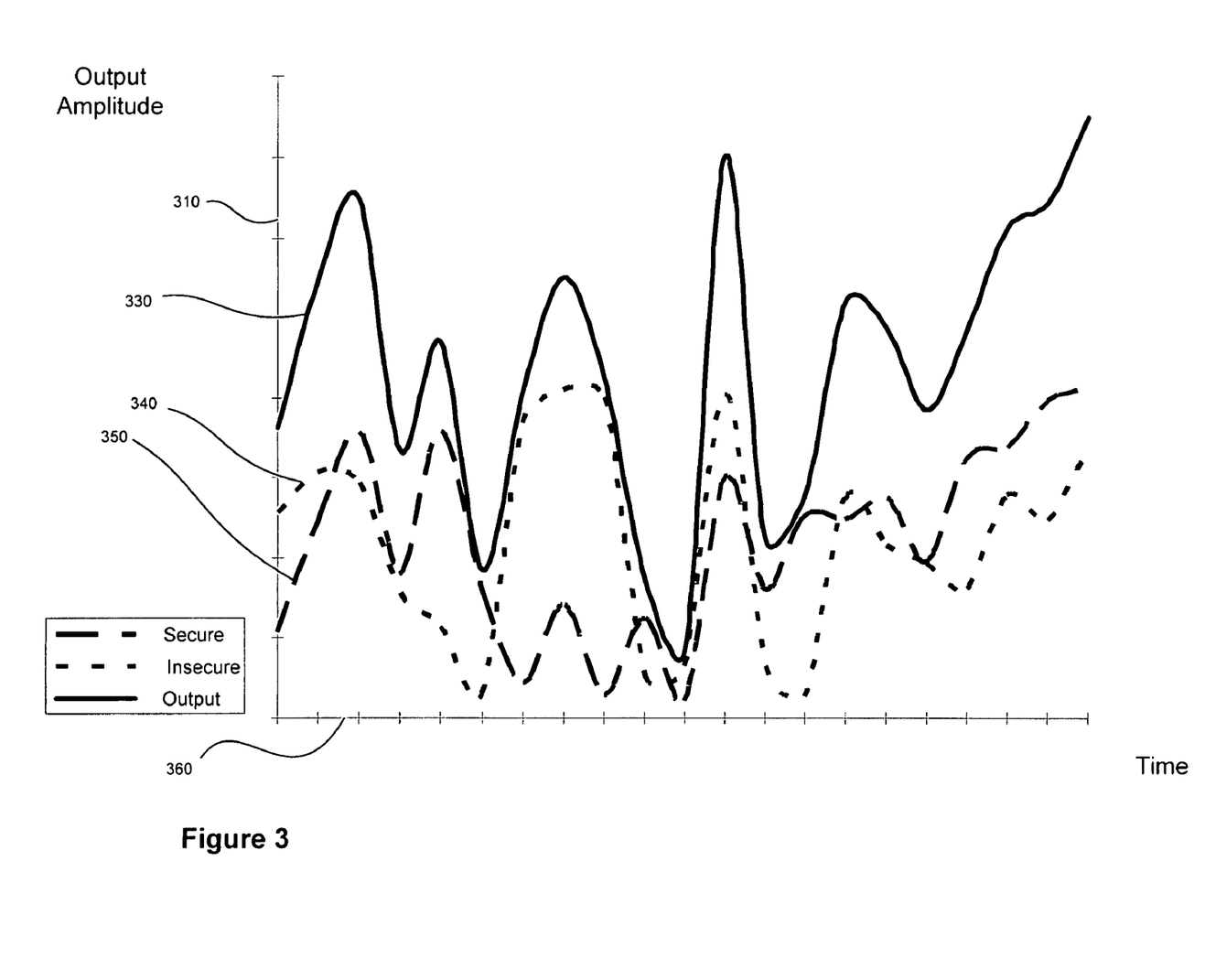
FIG. 3 represents the output data of a virtual and real audio adapter in combination in one embodiment.

FIG. 3 depicts the operation of the embodiment when an insecure audio application seeks output-only access to the audio device. The figure is a graph of the audio output data of the platform, plotting amplitude 310 against time 360. The figure shows the output waveform 330 obtained at the audio output of the platform. Waveform 330 is obtained by summing the audio output 350 of the applications in the secure VM accessing the audio device model in the secure VM with the audio outputs 340 of the applications in the insecure VM accessing the virtual device model in the insecure VM.

Figure 4:
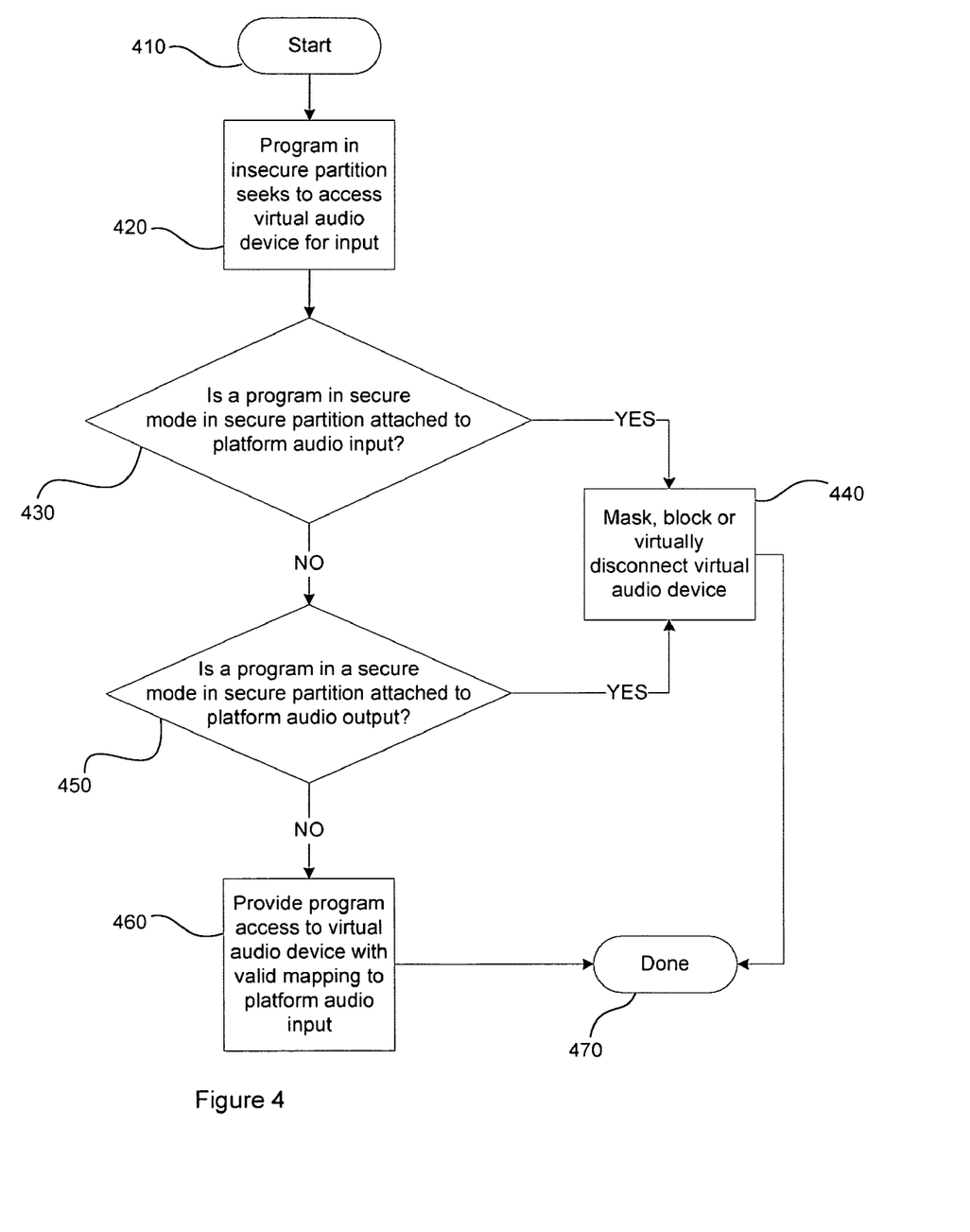
FIG. 4 is a high level flow diagram of the operation of one embodiment.

FIG. 4 depicts at a high level the operation of the embodiment when an insecure audio application seeks input access to the audio device at 420. If any program in the secure VM is attached to the audio device of the platform in input mode, 430 or in output mode, 450, the SVMM may trap the access. The virtual audio device model is then disabled, 440. Otherwise, the program in the insecure partition may be provided access to the audio device, 460.

The action in 440 may be taken in a variety of ways. First, the virtual device may simply be placed in a mode where it transmits null data to attached insecure programs while the secure program is actually attached to platform audio. Second, the virtual device may be blocked with a graceful handling of any resultant errors that may occur in the accessing program in the insecure VM. An alternative approach is to model the virtual audio device as a hot-pluggable device. An application accessing a hot-pluggable device is generally designed to deal gracefully with its disconnection. Thus when the action in 440 is taken in this instance, the virtual device model simulates a hot-unplug event of the device and thus makes the platform audio device unavailable to the application in the insecure virtual machine.

In some embodiments, the platform may have both insecure and secure audio devices connected to it. In such cases, the monitor is aware of the state of each device. When a secure device is being accessed by an audio application in a secure mode, the monitor will in such cases disable all insecure audio devices attached to the platform. Thus for example, if an insecure audio device such as a webcam, MP3 player or digital recorder of any type is attached to the USB bus in addition to a secure audio device such as a sound card, the SVMM may disable the USB bus or the specific devices on the bus that are insecure audio devices. As before, this may be done by blocking, null streaming or masking, or by simulating a disconnection event.

Many variations of the above-described embodiments are possible. A simpler scheme where a primitive monitor and a partitioning scheme that does not require full virtualization is sufficient to implement the type of separation of secure audio applications from other audio applications. The partitions may be implemented by an operating system, or other system such as a BIOS, or other low-level firmware or software operating as a monitor. Thus in general, the secure audio application may merely execute in a different partition in some embodiments without having a separate virtual machine dedicated to it. Many methods of providing access to an audio I/O device are known in the art. Many different types of device driver and interfaces to the driver may be used in the two audio models used in the secure and insecure partitions. The two models may or may not be identical. Furthermore the mechanism to disable and enable audio access in the insecure partition may vary. The mechanisms such as providing a stream of null data, blocking, and simulating hot-unplugging are merely illustrative and many other embodiments are possible. The control of disabling and enabling may reside in either the monitor or in the secure partition or VM, or in both. In other embodiments there may be other devices exclusively accessed by the secure partition, in others, there may be none.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine readable medium. Any of these mediums may "carry" or "indicate" the design or software information.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD- ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method comprising:
   executing a secure virtual machine monitor (SVMM) on a platform, the SVMM capable of providing exclusive secure access to an audio I/O device of the platform;
   executing a first partition virtual machine on the platform;
   providing an audio device model for applications executing in the a first partition virtual machine by directly mapping the audio I/O device from provided by the SVMM to the first partition virtual machine;
   providing a virtual audio device model in a second partition virtual machine by remapping the audio device model from the first partition virtual machine to the second partition virtual machine;
   providing exclusive secure access to the audio I/O device to a program performing an audio function in a secure mode in the first partition virtual machine by disabling via the SVMM the virtual audio device model in the second partition virtual machine;
   preventing an insecure audio I/O program, coupled with the virtual audio device model, from performing associated input audio function if the program in the first partition virtual machine is executing in the secure mode; and
   summing output data from the audio device model in the first partition virtual machine with output data from the insecure audio I/O program when the program in the first partition virtual machine and the insecure audio I/O program seek output only access to the audio I/O device.

2. The method of claim 1, wherein disabling the virtual audio device model further comprises providing an application accessing the virtual device model with a stream of null data.

3. The method of claim 1, wherein disabling the virtual audio device model further comprises:
   blocking access, by an application, to the virtual audio device model.

4. The method of claim 1, wherein the virtual audio device model comprises a model of a hot-pluggable device, and wherein disabling the virtual audio device model further comprises simulating of a hot unplug event of the virtual audio device model.

5. The method of claim 1, wherein providing secure access to the audio I/O device further comprises:
   disabling, via the SVMM, direct memory access to a memory location for storing audio data, the disabling by a program executing in the second partition virtual machine.

6. The method of claim 1 further comprising:
   providing a sum of the output data to the audio device model in the first partition virtual machine; and
   providing the output data to the virtual audio device model in the second partition virtual machine to the audio I/O device when no application is performing an audio function in a secure mode in the first partition virtual machine.

7. The method of claim 1 further comprising:
   monitoring all audio devices communicatively coupled with the platform; and preventing operation of any insecure audio devices communicatively coupled with the platform if the program in the first partition virtual machine is executing in a secure mode.

8. A system comprising:
   a platform comprising a processor and a memory;
   a secure virtual machine monitor (SVMM) resident in the memory and executable on the platform capable of providing exclusive secure access to an audio I/O device of the platform;
   a first partition virtual machine executable on the platform;
   an audio device model in the first partition virtual machine for applications executing in the a first partition virtual machine to directly map the audio I/O device provided by the SVMM to the first partition virtual machine; and
   a virtual audio device model in a second partition virtual machine, the virtual audio device model provided to the second partition virtual machine by remapping the audio device model from the first partition virtual machine to the second partition virtual machine; and
   a program performing an audio function in a secure mode in the first partition virtual machine by disabling via the SVMM the virtual audio device model in the second partition virtual machine,
   wherein the SVMM is operable to prevent an insecure audio I/O program, coupled with the virtual audio device model, from performing associated input audio function if the program in the first partition virtual machine is executing in the secure mode, and
   wherein the SVMM is further operable to sum output data from the audio device model in the first partition virtual machine with output data from the insecure audio I/O program when the program in the first partition virtual machine and the insecure audio I/O program seek output-only access to the audio I/O device.

9. The system of claim 8, wherein the virtual audio device model comprises a model of a hot-pluggable device, and wherein the SVMM is operable to simulate a hot unplug event of the virtual audio device model.

10. The system of claim 8, wherein the SVMM is further operable to disable direct memory access to a memory location for storing audio data, the SVMM operable to disable by a program executing in the second partition virtual machine.

11. The system of claim 8, wherein the SVMM is further operable to provide:
    a sum of the output data to the audio device model in the first partition virtual machine, and the output data to the virtual audio device model in the second partition virtual machine to the audio I/O device when no application is performing an audio function in a secure mode in the first partition virtual machine.

12. The system of claim 8, wherein the SVMM is further operable to:

monitor all audio devices communicatively coupled with the platform; and prevent operation of any insecure audio devices communicatively coupled with the platform if the program in the first partition virtual machine is executing in a secure mode.

13. A machine accessible medium having stored thereon data that when accessed by a machine causes the machine to perform a method, the method comprising:

executing a secure virtual machine monitor (SVMM) on a platform, the SVMM capable of providing exclusive secure access to an audio I/O device of the platform;

executing a first partition virtual machine on the platform;

providing an audio device model for applications executing in the a first partition virtual machine by directly mapping the audio I/O device from provided by the SVMM to the first partition virtual machine;

providing a virtual audio device model in a second partition virtual machine by remapping the audio device model from the first partition virtual machine to the second partition virtual machine;

providing exclusive secure access to the audio I/O device to a program performing an audio function in a secure mode in the first partition virtual machine by disabling via the SVMM the virtual audio device model in the second partition virtual machine;

preventing an insecure audio I/O program, coupled with the virtual audio device model, from performing associated input audio function if the program in the first partition virtual machine is executing in the secure mode; and summing output data from the audio device model in the first partition virtual machine with output data from the insecure audio I/O program when the program in the first partition virtual machine and the insecure audio I/O program seek output-only access to the audio I/O device.

14. The machine accessible medium of claim 13, wherein disabling the virtual audio device model further comprises:

providing an application accessing the virtual device model with a stream of null data.

15. The machine accessible medium of claim 13, wherein disabling the virtual audio device model further comprises blocking access by an application to the virtual audio device model.

16. The machine accessible medium of claim 13, wherein the virtual audio device model comprises a model of a hot-pluggable device, and wherein disabling the virtual audio device model further comprises simulating of a hot unplug event of the virtual audio device model.

17. The machine accessible medium of claim 13, wherein providing secure access to the audio I/O device further comprises:

disabling, via the SVMM, direct memory access to a memory location for storing audio data, the disabling by a program executing in the second partition virtual machine.

18. The machine accessible medium of claim 13, further comprising:

providing a sum of the output to the audio device model in the first partition virtual machine; and providing the output to the virtual audio device model in the second partition virtual machine to the audio I/O device when no application is performing an audio function in a secure mode in the first partition virtual machine.

19. The machine accessible medium of claim 13 further comprising:

monitoring all audio devices communicatively coupled with the platform; and preventing operation of any insecure audio devices communicatively coupled with the platform if the program in the first partition virtual machine is executing in a secure mode.

* * * * *